US010189576B2

(12) United States Patent
Martindale et al.

(10) Patent No.: US 10,189,576 B2
(45) Date of Patent: Jan. 29, 2019

(54) LIQUID STORAGE TANK

(71) Applicant: BAE Systems plc, London (GB)

(72) Inventors: Nicholas John Martindale, South Gloucestershire (GB); Nicholas Park, South Gloucestershire (GB); Simon Anthony Jenkins, South Gloucestershire (GB); Andrew James Irwin, Lancashire (GB); Christopher Steven Bingham, Lancashire (GB); Chrisostomos Angelis Constantinou, South Gloucestershire (GB)

(73) Assignee: BAE SYSTEMS PLC, London (GB)

( * ) Notice: Subject to any disclaimer, the term of this patent is extended or adjusted under 35 U.S.C. 154(b) by 229 days.

(21) Appl. No.: 15/308,437

(22) PCT Filed: May 6, 2015

(86) PCT No.: PCT/GB2015/051321
§ 371 (c)(1),
(2) Date: Nov. 2, 2016

(87) PCT Pub. No.: WO2015/170088
PCT Pub. Date: Nov. 12, 2015

(65) Prior Publication Data
US 2017/0096234 A1 Apr. 6, 2017

(30) Foreign Application Priority Data
May 7, 2014 (EP) .................................... 14275104
May 7, 2014 (GB) ................................... 1408016.2

(51) Int. Cl.
*B64C 3/34* (2006.01)
*B64D 37/32* (2006.01)
(Continued)

(52) U.S. Cl.
CPC .............. *B64D 37/06* (2013.01); *B60K 15/03* (2013.01); *B60K 15/03006* (2013.01);
(Continued)

(58) Field of Classification Search
CPC .. B64D 2037/325; B64D 37/02; B64D 37/04; B64D 37/06; B64D 37/08; B64D 37/32;
(Continued)

(56) References Cited

U.S. PATENT DOCUMENTS 1,874,685 A * 8/1932 Wright ..................... B64C 3/26
244/123.14
1,911,058 A * 5/1933 Bushnell .............. B65D 90/024
220/651
(Continued)

FOREIGN PATENT DOCUMENTS

DE 19749950 A1 5/1999
DE 10218144 A1 11/2003
(Continued)

OTHER PUBLICATIONS

Great Britain Search Report for application 1408016.2 dated Oct. 29, 2014, 3 pages.
(Continued)

*Primary Examiner* — Allan Stevens
(74) *Attorney, Agent, or Firm* — Maine Cernota & Rardin

(57) ABSTRACT

A liquid storage tank, for example an aircraft fuel tank, having a tank wall enclosing a liquid storage space, and a tie assembly located at least partially within the liquid storage space. The tie assembly includes an elongate member, for example a wire or cable, and a plurality of attachment devices fixed to an inner surface of the tank wall. The elongate member includes a plurality of spaced part points along its length, each of the spaced apart points being fixed
(Continued)

to a respective attachment device such that the tie assembly resists outward deformation of the tank wall.

9 Claims, 2 Drawing Sheets

(51) Int. Cl.

| | | |
|---|---|---|
| *B64D 37/06* | (2006.01) | |
| *F41H 7/00* | (2006.01) | |
| *B60K 15/063* | (2006.01) | |
| *B60K 15/073* | (2006.01) | |
| *B60K 15/03* | (2006.01) | |

(52) U.S. Cl.
CPC ...... *B60K 15/03177* (2013.01); *B60K 15/063* (2013.01); *B60K 15/073* (2013.01); *B64D 37/32* (2013.01); *F41H 7/00* (2013.01); *B60K 2015/03032* (2013.01); *B60K 2015/03407* (2013.01); *B60K 2015/03486* (2013.01); *B60K 2015/03493* (2013.01); *B60Y 2200/51* (2013.01); *B64D 2037/325* (2013.01); *Y02T 50/44* (2013.01)

(58) Field of Classification Search
CPC .... B60K 15/03006; B60K 2015/03407; B60K 2015/03381; B60K 15/073; B60K 2015/03032; B60K 2015/03046; B65C 3/34; B65C 3/1824; B64C 3/26; B65D 90/32; B65D 90/325
USPC .............. 220/562, 563, 564, 560.11, 560.01, 220/560.07, 567.2, 651, 653
See application file for complete search history.

(56) References Cited

U.S. PATENT DOCUMENTS

| | | | | |
|---|---|---|---|---|
| 2,343,005 | A | * | 2/1944 | Gardner ................ B29C 33/505 249/61 |
| 2,354,701 | A | | 8/1944 | Pescara |
| 2,519,393 | A | | 8/1950 | Noyes |
| 2,754,992 | A | | 7/1956 | Wilson |
| 3,004,509 | A | | 10/1961 | Leroux |
| 3,420,477 | A | * | 1/1969 | Howard ................ B64D 37/04 244/129.1 |
| 3,616,189 | A | | 10/1971 | Harr |
| 3,712,139 | A | * | 1/1973 | Harvey ................ G01F 19/00 220/653 |
| 3,969,563 | A | | 7/1976 | Hollis, Sr. |
| 4,336,291 | A | | 6/1982 | Broadhurst |
| 4,360,124 | A | | 11/1982 | Knaus |
| 4,469,295 | A | | 9/1984 | Schuster |
| 4,828,206 | A | | 5/1989 | Bruno |
| 4,925,057 | A | | 5/1990 | Childress |
| 5,195,650 | A | | 3/1993 | Leidig |
| 5,451,015 | A | | 9/1995 | Cronkhite |
| 5,462,193 | A | * | 10/1995 | Schoo ................ F17C 1/02 220/652 |
| 5,474,207 | A | * | 12/1995 | Nouhra ................ B65D 88/10 220/653 |
| 5,647,503 | A | * | 7/1997 | Steele ................ B29C 70/24 220/589 |
| 5,674,586 | A | | 10/1997 | Toni |
| 5,738,925 | A | | 4/1998 | Chaput |
| 6,220,287 | B1 | | 4/2001 | Wolf |
| 7,861,884 | B2 | | 1/2011 | Childress |
| 7,934,619 | B1 | * | 5/2011 | Robertson ............ C02F 3/1247 220/651 |
| 8,096,223 | B1 | | 1/2012 | Andrews |
| 9,266,619 | B2 | | 2/2016 | Childress |
| 2002/0047015 | A1 | | 4/2002 | Distelhoff |
| 2005/0085146 | A1 | | 4/2005 | Farkas |
| 2006/0174417 | A1 | | 8/2006 | Elrod |
| 2007/0017359 | A1 | | 1/2007 | Gamache |
| 2008/0148929 | A1 | | 6/2008 | Graphenius |
| 2009/0090236 | A1 | | 4/2009 | Misencik |
| 2009/0152278 | A1 | | 6/2009 | Lindner |
| 2009/0236163 | A1 | | 9/2009 | Wibbeke et al. |
| 2011/0017748 | A1 | | 1/2011 | Palma |
| 2011/0094598 | A1 | | 4/2011 | Childress et al. |
| 2011/0168728 | A1 | * | 7/2011 | McDermott .......... B65D 88/10 220/653 |
| 2012/0055937 | A1 | | 3/2012 | Monk |
| 2012/0181288 | A1 | | 7/2012 | Childress |
| 2012/0266745 | A1 | | 10/2012 | Warren |
| 2013/0082062 | A1 | | 4/2013 | Kawamoto et al. |
| 2015/0102040 | A1 | | 4/2015 | Bornes |

FOREIGN PATENT DOCUMENTS

| | | | |
|---|---|---|---|
| DE | 202013103931 U | 9/2013 | |
| EP | 0056289 A1 | 7/1982 | |
| EP | 124205 A1 | 7/1984 | |
| EP | 0299503 A2 | 1/1989 | |
| EP | 0689991 B1 | 2/1999 | |
| EP | 1147934 A1 | 10/2001 | |
| EP | 2048079 A2 | 4/2009 | |
| FR | 493293 A | 8/1919 | |
| FR | 2101483 A5 | 3/1972 | |
| FR | 2264566 A1 | 10/1975 | |
| FR | 3011822 A1 | 4/2015 | |
| GB | 191217292 A | 11/1912 | |
| GB | 367579 A | 2/1932 | |
| GB | 565121 A | 10/1944 | |
| GB | 0567936 A | 3/1945 | |
| GB | 584741 A | * 1/1947 | ............. B64D 37/06 |
| GB | 585517 A | 2/1947 | |
| GB | 685440 A | 1/1953 | |
| GB | 1231675 A | 5/1971 | |
| GB | 1510860 A | 5/1978 | |
| GB | 2054456 A | 2/1981 | |
| GB | 2054457 A | 2/1981 | |
| GB | 2088806 A | 6/1982 | |
| GB | 2124887 A | 2/1984 | |
| GB | 2155873 A | 10/1985 | |
| GB | 2198099 A | 6/1988 | |
| GB | 2275455 A | 8/1994 | |
| JP | 2007237776 A | 9/2007 | |
| WO | 1996039335 A1 | 12/1996 | |
| WO | 0034121 A1 | 6/2000 | |
| WO | 2006015456 A1 | 2/2006 | |
| WO | 2012101439 A1 | 8/2012 | |
| WO | 2012173594 A1 | 12/2012 | |

OTHER PUBLICATIONS

Great Britain Search and Examination Report of application GB1507724.1 dated Oct. 27, 2015, 7 pages.
International Preliminary Report on Patentability for application PCT/GB2015/051321 dated Apr. 25, 2016, 18 pages.
International Search Report for application PCT/GB2015/051321 dated Jul. 7, 2015, 12 pages.
European Search Report for application 14275105.6 dated Nov. 2, 2014, 8 pages.
Great Britain Search Report for application 1408018.8 dated Oct. 30, 2014, 3 pages.
Great Britain Search and Examination Report for application 1507731.6 dated Oct. 29, 2015, 6 pages.
International Search Report for application PCT/GB2015/051325 dated Jul. 6, 2015, 11 pages.
International Preliminary Report on Patentability of Application No. PCT/GB2015/051324, dated Apr. 8, 2016, 16 pages.
International Search Report and Written Opinion of Application No. PCT/GB2015/051324, dated Jul. 6, 2015, 12 pages.
International Preliminary Report on Patentability PCT/GB2015/051327, dated Apr. 21, 2016, 18 pages.
Great Britain Search Report of application GB1408020.4 dated Oct. 30, 2014, 3 pages.

(56) References Cited

OTHER PUBLICATIONS

Great Britain Search and Examination Report of application GB1507732.4 dated Oct. 22, 2015, 8 pages.
European Search Report for application 14275107.2 dated Nov. 10, 2014, 10 pages.
International Search Report for application PCT/GB2015/051327 dated Jul. 2, 2015, 10 pages.
European Search Report for application 14275104.9 dated Nov. 5, 2014, 9 pages.
Characteristics of Kyocera Technical Ceramics, Jun. 30, 2004, XP055149244, Retrieved Oct. 28, 2014 from url: http://americas.kyocera.com/kicc/pdf/kyocera_Material_Characteristics.pdf.
Great Britain Combination Exam and Search Report of Application No. GB1507725.8, dated Nov. 3, 2015, 6 pages.
Great Britain Search Report of Application No. GB1408013.9, dated Nov. 19, 2014, 4 pages.
Extended European Search Report of Application No. EP14275102, dated Oct. 28, 2014, 9 pages.
International Search Report and Written Opinion of Applciation No. PCT/GB2015/051322, dated Jul. 2, 2015, 14 pages.
Extended European Search Report of Application No. EP14275103, dated Nov. 5, 2014, 9 pages.
Great Britain Search Report of Application GB1408015.4, dated Oct. 29, 2014, 3 pages.
Great Britain Combined Search and Exam Report of Application No. GB1507727.4, dated Oct. 29, 2015, 7 pages.
International Preliminary Report on Patentability for application No. PCT/GB2015/051325, dated Nov. 8, 2016, 8 pages.

\* cited by examiner

LIQUID STORAGE TANK

RELATED APPLICATIONS

This application is a national phase application filed under 35 USC § 371 of PCT Application No. PCT/GB2015/051321 with an International filing date of May 6, 2015, which claims priority of GB Patent Application GB1408016.2 filed May 7, 2014 and EP Patent Application EP14275104.9 filed May 7, 2014. Each of these applications is herein incorporated by reference in its entirety for all purposes.

FIELD OF THE INVENTION

The present invention relates to liquid storage tanks.

BACKGROUND

A high speed projectile on impact with and penetration into a liquid containing tank generates very high pressure in the liquid. This phenomenon, known as hydrodynamic ram, typically includes the generation of shock waves and subsequent pressure pulses in the liquid. These pressures, combined with the penetration damage from the projectile, can cause damage to the tank structure and frequently are the cause of catastrophic failure of the tank. The hydrodynamic ram pressure pulses are intense but of short duration which propagate through the liquid in the tank.

There is thus a need for means for reducing hydrodynamic ram pressure in the liquid in such a tank and for a generally improved tank which has an improved ability to sustain projectile impact without catastrophic failure.

SUMMARY OF THE INVENTION

In a first aspect, the present invention provides a liquid storage tank comprising a tank wall enclosing a liquid storage space, and a plurality of tie assemblies located at least partially within the liquid storage space. Each tie assembly comprises an elongate member, and a plurality of attachment devices fixed to an inner surface of the tank wall. For each tie assembly, the elongate member of that tie assembly includes a plurality of spaced part points along its length, each of the spaced apart points being fixed to a respective attachment device of that tie assembly, and each attachment device of that tie assembly is attached to a different inner surface of the tank wall such that the elongate member of that tie assembly crosses the liquid storage space. The tie assemblies are more closely spaced together at or proximate to edges of the liquid storage tank.

One or more elongate members may comprise one or more wires. One or more elongate members may comprise a plurality of wires that are coupled together so as to form a cable. One or more elongate members may be made of metal or poly-paraphenylene terephthalamide.

Each tie assembly may be configured to exert an inward force on the tank wall.

One or more of the elongate members may be substantially normal to the tank wall at a point at which that elongate member is fixed to the tank wall.

Multiple attachment devices may be formed on a common elongate bracket which is fixed to the internal surface of the tank wall.

The total cavity volume of the tie assemblies in the liquid storage space may be less than or equal to 5% by volume of the liquid storage space volume.

The tank may be an aircraft fuel tank.

The tank wall may comprise an aircraft external skin and an aircraft substructure.

For at least one of the tie assemblies, the elongate member of that tie assembly may be attached between a first attachment device of that tie assembly and a second attachment device of that tie assembly. The first attachment device may be different to the second attachment device. The first attachment device may be fixed to an internal surface of the aircraft external skin. The first attachment device may be fixed to the aircraft substructure.

The tie assemblies may be more closely spaced together at or proximate to points at which the aircraft external skin is attached to the aircraft substructure.

In a further aspect, the present invention provides a vehicle comprising a liquid storage tank according to any of the above aspects.

In a further aspect, the present invention provides a method of providing a liquid storage tank. The method comprises: providing a tank wall enclosing a liquid storage space, attaching a plurality of tie assemblies to the tank wall. The tie assemblies are more closely spaced together at or proximate to edges of the liquid storage tank. Each tie assembly comprises an elongate member and a plurality of attachment devices. Attaching the plurality of tie assemblies to the tank wall comprises: fixing a plurality of attachment devices to an inner surface of the tank wall, and fixing a plurality of elongate members to the attachment devices, each elongate member being attached between a different respective pair of spaced apart attachment devices. For each pair of spaced apart attachment devices between which an elongate member is attached, each attachment device of that pair is fixed to a different inner surface of the tank wall such that the elongate member attached between that pair of spaced apart attachment devices crosses the liquid storage space.

One or more of the elongate members may comprise one or more wires. The method may further include, fixing the one or more wires to spaced apart attachment devices, and subsequently tightening the one or more wires so as to exert an inward force on the tank wall.

In a further aspect, the present invention provides a liquid storage tank comprising a tank wall enclosing a liquid storage space, and at least one tie assembly located at least partially within the liquid storage space. The tie assembly comprises an elongate member, and a plurality of attachment devices fixed to an inner surface of the tank wall (such that they are spaced apart from one another). The elongate member includes a plurality of spaced part points along its length, and each of the spaced apart points is fixed to a respective attachment device such that the tie assembly resists outward deformation of the tank wall.

The elongate member may comprise one or more wires.
The elongate member may comprise a plurality of wires that are coupled together so as to form a cable.
The elongate member may be made of metal or poly-paraphenylene terephthalamide.
The tie assembly may be configured to exert an inward force on the tank wall.
The elongate member may be substantially normal to the tank wall at a point at which the elongate member is fixed to the tank wall.
The liquid storage tank may further comprise one or more further a tie assemblies located at least partially within the liquid storage space. Each further tie assembly may comprise a plurality of further attachment devices fixed to an inner surface of the tank wall, and a further elongate member including a plurality of spaced part points along its length, each of those spaced apart points being fixed to a respective further attachment device such that the further tie assembly resists outward deformation of the tank wall.

The tie assembly and one or more further tie assemblies may be in a spaced apart relation within the tank. The tie assembly and further tie assemblies may be more closely spaced at or proximate to the centre of the liquid storage tank. The tie assembly and further tie assemblies may be more closely spaced at or proximate to the edges of the liquid storage tank.

Multiple attachment devices may be formed on a common elongate bracket which may be fixed to the internal surface of the tank wall.

The total cavity volume of the tie assembly and/or further tie assemblies in the liquid storage space may be less than or equal to 5% by volume of the liquid storage space volume.

The tank may be an aircraft fuel tank.

In a further aspect, the present invention provides a vehicle (e.g. an aircraft) comprising a liquid storage tank (e.g. an aircraft fuel tank located in the wing of the aircraft) according to the preceding aspect.

In a further aspect, the present invention provides a method of installing a tie assembly in a liquid storage tank, the tie assembly comprising an elongate member and a plurality of attachment devices. The method comprises: fixing each attachment device to an inner surface of a tank wall of a liquid storage tank, and fixing the elongate member to spaced apart attachment devices, thereby installing the tie assembly in the liquid storage tank such that the tie assembly resists outward deformation of the tank wall.

The elongate member may comprise one or more wires. The method may further include, after fixing the elongate member to spaced apart attachment devices, tightening the elongate member such that the tie assembly exerts an inward force on the tank wall.

DETAILED DESCRIPTION

Figure 1:
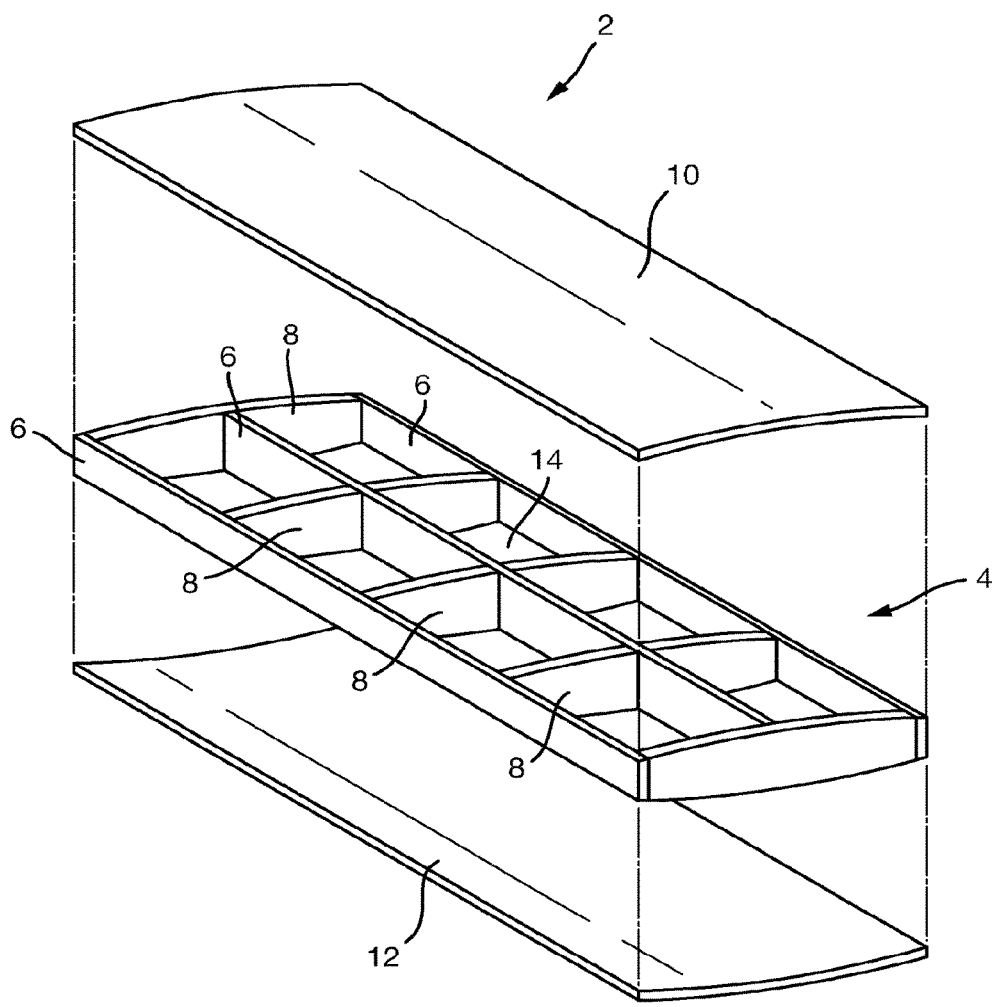
FIG. 1 is a schematic illustration (not to scale) of an exploded view of an example aircraft wing.

In the following description, like reference numerals refer to like elements.

The following description is based on embodiments of the invention and should not be taken as limiting the invention with regard to alternative embodiments that are not explicitly described herein. Structural material types and methods of construction provided herein are examples only.

It will be appreciated that relative terms such as top and bottom, upper and lower, and so on, are used merely for ease of reference to the Figures, and these terms are not limiting as such, and any two differing directions or positions and so on may be implemented.

FIG. 1 is a schematic illustration (not to scale) of an exploded view of an example aircraft wing 2 in which a hydrodynamic ram reducing assembly is implemented.

The aircraft wing 2 comprises a substructure 4 comprising a plurality of spars 6 and ribs 8. The spars 6 are spaced apart from one another and are aligned along the length of the aircraft wing 2. The spars 6 are coupled together by the spaced apart ribs 8 which are substantially perpendicular to the spars 6. The spars 6 and ribs 8 are connected together by fasteners (not shown in the Figures). The spars 6 and ribs 8 are made of carbon fibre composite (CFC) material, i.e. a composite material comprising a polymer matrix reinforced with carbon fibres. In other examples, the spars 6 and ribs 8 are made of a different appropriate material, for example, aluminium.

The aircraft wing 2 further comprises external skins, namely an upper skin 10 and a lower skin 12. The upper skin 10 comprises a plurality of panels made of CFC material. The upper skin 10 is attached to an upper surface of the substructure 4 by fasteners (not shown in the Figures). The lower skin 12 comprises a plurality of panels made of CFC material. The lower skin 12 is attached to a lower surface of the substructure 4 by fasteners (not shown in the Figures). The external skin 10, 12 may each be, for example, 8 mm thick.

When the substructure 4 and the external skins 10, 12 are attached together (and, for example, bonded with a sealant), a cavity defined by the substructure 4 and skins 10, 12 is formed. Such a cavity is used as a fuel tank for storing aircraft fuel and is indicated in FIG. 1 by the reference numeral 14. The fuel tank is described in more detail later below with reference to FIG. 2.

The aircraft wing 2 further comprises a leading edge structure, a trailing edge structure and a wing tip structure, which are not shown in FIG. 1 for reasons of clarity.

Figure 2:
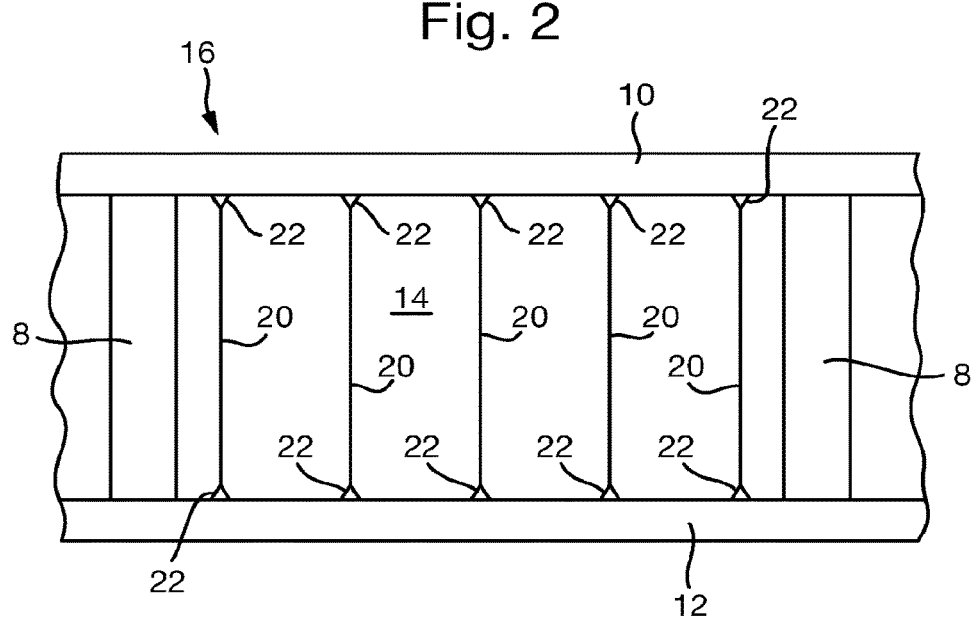
FIG. 2 is a schematic illustration (not to scale) showing a cross section through a fuel tank in the aircraft wing.

FIG. 2 is a schematic illustration (not to scale) showing a cross section through the fuel tank 16 in the aircraft wing 2 taken parallel to the length of the aircraft wing 2 (i.e. perpendicular to a longitudinal or roll axis of an aircraft to which the wing 2 is attached).

In this embodiment, the outer walls of the fuel tank 16 are provided by spars 6, ribs 8, and the upper and lower skins 10, 12. Aircraft fuel is stored in the cavity 14 defined by the fuel tank outer walls.

In this embodiment, the fuel tank 16 comprises a plurality of tie assemblies within the fuel storage cavity 14.

The tie assemblies interconnect opposite walls of the fuel tank 16. In particular, in this embodiment, the tie assemblies interconnect the upper skin 10 and the lower skin 12.

In this embodiment, each tie assembly comprises an elongate cable 20 and two attachment devices 22.

In this embodiment, the cables 20 comprise a plurality of separate wires that are bonded, twisted, or braided together so as to form a single assembly. In this embodiment, the wires of the cables 20 are made of a material that is non-reactive with the fuel in the fuel tank 16 and has a high tensile strength, for example, stainless steel. In other embodiments, one or more wires of the cables 20 may be made of a different appropriate material such as an aramid or para-aramid synthetic fibre such as poly-paraphenylene terephthalamide which is more common known as Kevlar™. In other embodiments, one or more of the cables 20 may be replaced by a different structure such as a rigid rod, or a strip of material.

In this embodiment, the cables 20 have a thickness of between 2 mm and 10 mm. However, in other embodiments, one or more of the cables 20 may have a different appropriate thickness.

In this embodiment, the cables 20 are taut such that the cables 20 exert a nominal inwards force on the external skins 10, 12. This inwards force advantageously tends to oppose the outward bowing of the skins that may be caused by impact of a projectile with the fuel tank 16 as described in more detail later below with reference to FIG. 3. The tie assemblies may be installed in the fuel tank 16 by firstly attaching the attachment devices 22 to the fuel tank walls, coupling a cable 20 between pairs of attachment devices 22, and subsequently tightening the cables 20 to pull them taut.

In this embodiment, the tie assemblies are arranged in the fuel tank 16 such that the cables 20 are substantially normal to the upper and lower skins 10, 12.

In this embodiment, the attachment devices 22 of each tie assembly are fixedly attached to opposite ends of the cable 20 of that tie assembly. The attachment devices 22 of each tie assembly attach the cable 20 of that tie assembly to opposite walls of the fuel tank 16 i.e. to the upper and lower skins 10, 12. The attachment devices 22 may be attached to the skins 10, 12 by any appropriate means. For example, an attachment device 22 may be glued or welded to the internal surfaces of the tank walls. Alternatively, an attachment device 22 may be embedded within, or integrally formed with, the tank walls. For example, the attachment devices may be stitched into the CFC panels that form the skins 10, 12 such that the attachment devices 22 are embedded within the skins 10, 12. Alternatively, an attachment device 22 may include a fastener that passes through a skin 10, 12 from the external surface of the fuel tank wall to the internal surface of the fuel tank wall.

In this embodiment, the attachment devices 22 are separate, independent devices. However, in other embodiments, multiple attachment devices 22 may be formed on a common elongate bracket which may be fixed to the internal surface of the fuel tank 16 by any appropriate means, such as gluing or welding.

In this embodiment, the tie assemblies are substantially equally spaced apart between the ribs 8. Also, the tie assemblies are substantially equally spaced apart between the spars 6.

In some embodiments, it is preferable that the tie assemblies are more closely spaced together proximate to the edges of the fuel tank 16, e.g. in the regions proximate to the ribs 8/spars 6. In such embodiments, there is a higher concentration of tie assemblies in the regions in which the skin 10, 12 may detach from the spars 6 or ribs 8. Such regions tends to include failure critical attachments. Failure of the attachments of the skin 10, 12 to the spars 6 or ribs 8 tends to be more likely to lead to aircraft failure. Thus, more closely spacing tie assemblies in regions close to the edges of the fuel tank tends to reduce or eliminate the likelihood of catastrophic failure of the fuel tank 16.

Displacement and deformation of the aircraft skin 10, 12 that occurs relatively far from the attachment points of the aircraft skins 10, 12 to the aircraft substructure 6, 8 tends to be less likely to cause aircraft failure than displacement and deformation of the aircraft skin 10, 12 proximate to the attachments of the skin 10, 12 to the spars 6 or ribs 8. Having tie assemblies more closely spaced together proximate to the edges of the fuel tank 16 tends to reduce the type of aircraft skin displacement that is more likely to cause aircraft failure, while allowing some degree of aircraft skin displacement away from failure points. Having tie assemblies more closely spaced together proximate to the edges of the fuel tank 16 tends to provide for improved hydrodynamic ram protection using fewer tie assemblies. Thus, aircraft weight may be reduced compared to embodiments in which the tie assemblies are substantially equally spaced apart between the ribs 8 and the spars 6.

In some embodiments, ties assemblies are located between, i.e. attach together, an aircraft skin 10, 12 and a spar 6 or rib 8 to which that aircraft skin 10, 12 is fastened. These assemblies are preferably located proximate to the attachment point of the skin 10, 12 to the spar 6 or rib 8. Thus, the likelihood of catastrophic failure of the fuel tank 16 tends to be further reduced.

Nevertheless, in some embodiments, the tie assemblies may be arranged differently, i.e. the spacings between the tie assemblies may vary along the tank 16. For example, in some embodiments, the tie assemblies are more closely spaced towards the centre of the fuel tank 16, e.g. in the region that is equidistant from the ribs 8/spars 6. In some situations, outward bowing of the walls of the fuel tank 16 such as may be caused by a projectile impacting a wall of the fuel tank 16 (which is described in more detail later below with reference to FIG. 3) tends to be greatest in this region and so having a higher concentration of tie assemblies in this region advantageously tends to reduce or eliminate this bowing.

As will now be described in more detail, the tie assemblies are operable to reduce damage resulting from hydrodynamic ram pressures in the fuel contained within the fuel tank 16.

Figure 3:
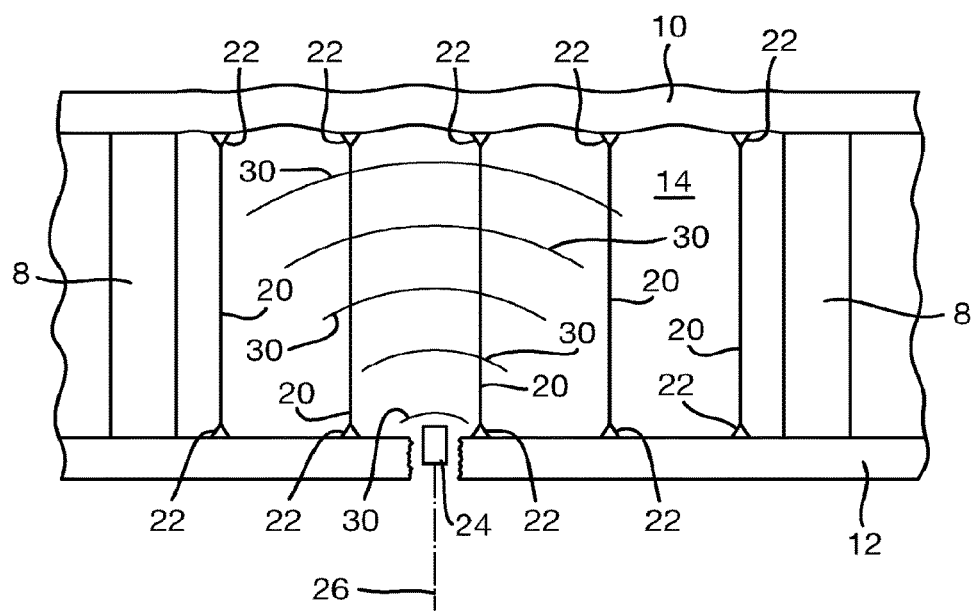
FIG. 3 is a schematic illustration (not to scale) illustrating effects of a projectile impacting with an external surface of the fuel tank.

FIG. 3 is a schematic illustration (not to scale) illustrating effects of a projectile 24 impacting with the lower skin 12 of the fuel tank 16. The path of the projectile through the lower skin 12 is indicated in FIG. 3 by the reference numeral 26.

The projectile 24 may be any appropriate projectile or foreign object such as a bullet, warhead fragment, a vehicle part, a rock, a maintenance tool, hail, ice, a bolt, etc. An example projectile has a weight of approximately 3.5 g, is substantially spherical in shape having a diameter of approximately 9.5 mm, and travels with a velocity of 1500 m/s. A further example projectile is a 44 g 12.5 mm bullet that travels with a velocity of 500 m/s.

In this example, the projectile 24 initially impacts with an external surface of the lower skin 12 and travels through the lower skin 12. The projectile 24 causes high strain rate shear damage to the lower skin 12 resulting in a hole in the lower skin 12 approximately the size of the projectile 24.

In this example, on piercing the lower skin 12, the projectile 24 impacts with the fluid within the cavity 14, thereby generating one or more high pressure shock waves 30 within the fluid. The shockwaves 30 travel through the fluid in the fuel tank 16 and impinge on the upper skin 10, thereby exerting an outwards force on the upper skin 10 which acts so as to cause the upper skin 10 to bow outwards. In conventional systems, this outward bowing of the upper skin may be sufficient to cause the upper skin 10 to decouple from the spars 6 or ribs 8, resulting in a catastrophic failure of the fuel tank 16 and loss of the aircraft. However, the tie assemblies are arranged to resist outward bowing of the upper skin 10. In this embodiment, this is achieved by coupling together the upper and lower skins 10, 12 such that outward movement of one skin relative to the other skin is opposed or prevented. Thus, the likelihood of damage to the walls of the fuel tank 16 (e.g. decoupling of the external skins 10, 12 from the spars 6 or ribs 8) tends to be reduced.

In this example, as the projectile 24 passes through the fluid in the fuel tank 16, a cavitation "wake" may form behind the projectile 24, i.e. a region of low pressure (e.g. a vapour or a vacuum) may form in the wake of the projectile 24. This causes a fluid displacement and an increase in the pressure of the fluid in the fuel tank 16. This increase in pressure in the fluid may be sufficient to cause the upper skin 10 to bow outwards. In conventional systems, this outward bowing of the upper skin may be sufficient to cause the upper skin 10 to decouple from the spars 6 or ribs 8, resulting in a catastrophic failure of the fuel tank 16 and loss of the aircraft. However, the tie assemblies are arranged to resist outward bowing of the upper skin 10. Thus, the likelihood of damage to the walls of the fuel tank 16 (e.g. decoupling of the external skin 10, 12 from the spars 6 or ribs 8) tends to be reduced.

An advantage provided by the above described tie assemblies is that hydrodynamic ram damage to a fuel tank caused by an object impacting with an external surface of the fuel tank tends to be reduced or eliminated. Thus, the likelihood of catastrophic failure of the fuel tank structure and corresponding aircraft loss tends to be reduced or eliminated. The tie assemblies tend to provide that the fuel tank is better able to accommodate the hydrodynamic ram pressures introduced by the impact of a projectile with the walls of the fuel tank.

Advantageously, the tie assemblies occupy a relative low volume within the fuel tank. In particular, the tie assemblies in combination occupy less than 5% of the total internal volume (i.e. capacity) of the fuel tank 16. In other embodiments, the tie assemblies occupy a different proportion of the fuel tank capacity.

The above described tie assemblies advantageously tend to be relative easy and cheap to manufacture.

The above described tie assemblies tend to be relatively easy to retrofit to existing aircraft fuel tanks.

The above described tie assemblies tend to provide protection against hydrodynamic ram damage whilst occupying a relatively small amount of the fuel tank's capacity.

The above described tie assemblies tend to be relatively lightweight so as not to be a significant burden to the aircraft.

In the above embodiments, the tie assemblies are implemented in an aircraft wing fuel tank. However, in other embodiments, the tie assemblies are used in a different type of container for containing fluid. In some embodiments, one or more walls of the container may be made of a different material to that described above.

In the above embodiments, the tie assemblies interconnect the upper skin and the lower skin and are arranged in the fuel tank such that the cables are substantially normal to the upper and lower skins. However, in other embodiments, one or more of the tie assemblies interconnect a different pair of fuel tank walls. Also, one or more of the tie assemblies may be arranged in the fuel tank such that one or more cables have a different orientation within the fuel tank. For example, one or more tie assembly may interconnect the ribs or spars that form the tank walls and may be arranged in the fuel tank such that the cables are substantially normal to the ribs or spars.

What is claimed is:

1. An aircraft fuel tank comprising:
   a tank wall enclosing a liquid storage space, the tank wall comprising two opposing aircraft external skins and an aircraft substructure disposed between the two aircraft external skins; and
   a plurality of tensionable tie assemblies located at least partially within the liquid storage space, each tensionable tie assembly comprising:
   a first attachment device fixed to an inner surface of a first of the aircraft external skins;
   a second attachment device fixed to an inner surface of a second of the aircraft external skins; and
   an elongate member fixed between the first and second attachment devices of that tie assembly such that the elongate member of that tie assembly crosses the liquid storage space;
   wherein the tensionable tie assemblies are capable of being tightened during installation, configured to exert an inward force on the tank wall, and are more closely spaced together at or proximate to points at which the aircraft external skins are attached to the aircraft substructure.

2. The aircraft fuel tank according to claim 1, wherein each elongate member comprises one or more wires.

3. The aircraft fuel tank according to claim 2, wherein each elongate member comprises a plurality of wires that are coupled together so as to form a cable.

4. The aircraft fuel tank according to claim 1, wherein one or more elongate members are made of poly-paraphenylene terephthalamide.

5. The aircraft fuel tank according to claim 1, wherein one or more of the elongate members are normal to the aircraft external skins at points at which that elongate member is fixed to the aircraft external skins.

6. The aircraft fuel tank according to claim 1, wherein a total cavity volume of the tensionable tie assemblies in the liquid storage space is less than or equal to 5% by volume of the liquid storage space.

7. An aircraft comprising the aircraft fuel tank according to claim 1.

8. A method of providing an aircraft fuel tank, the method comprising:
   providing a tank wall enclosing a liquid storage space, the tank wall comprising two opposing aircraft external skins and an aircraft substructure disposed between the two aircraft external skins; and
   attaching a plurality of tensionable tie assemblies to the tank wall;
   wherein, for each tensionable tie assembly, attaching that assembly to the tank wall comprises:
   attaching a first attachment device to an inner surface of a first of the aircraft external skins;
   attaching a second attachment device to an inner surface of a second of the aircraft external skins; and
   fixing an elongate member between the first and second attachment devices such that the elongate member crosses the liquid storage space;
   wherein the tensionable tie assemblies are capable of being tightened during installation, configured to exert an inward force on the tank wall, and are more closely spaced together at or proximate to points at which the aircraft external skins are attached to the aircraft substructure.

9. The method according to claim 8, wherein:
   one or more of the elongate members comprise one or more wires; and
   the method further includes, fixing the one or more wires between the first and second attachment devices, and subsequently tightening the one or more wires so as to exert an inward force on the tank wall.

* * * * *